G. Race.
Halter Hitch.
N° 86,587. Patented Feb. 2, 1869.
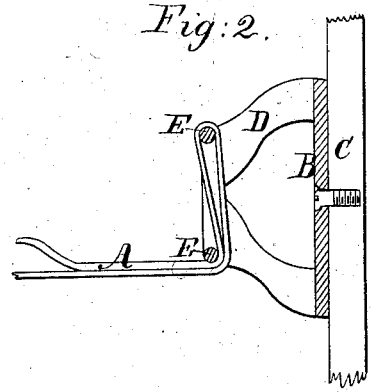
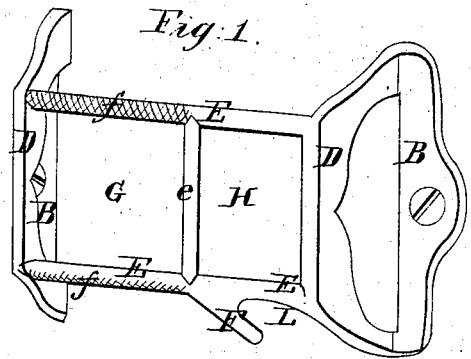
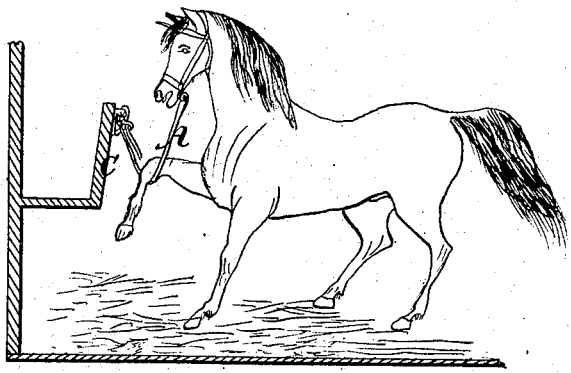
Witnesses;
J. B. Woodruff
J. C. Woodworth
Inventor,
George Race

GEORGE RACE, OF NORWICH, NEW YORK

Letters Patent No. 86,587, dated February 2, 1869.

IMPROVED HALTER-HITCH.

The Schedule referred to in these Letters Patent and making part of the same.

*To all whom it may concern:*

Be it known that I, GEORGE RACE, of Norwich, in the county of Chenango, and State of New York, have invented a certain new and useful Improvement in a Halter-Hitch for horses and cattle; and the following is a full, clear, and exact description of the same, reference being had to the accompanying drawings, making a part of this specification, in which—

Figure 1 represents a perspective view of my improved halter-hitch detached, as made of cast-metal, ready for use.

Figure 2 shows an end sectional view, as put up in place, and secured for hitching to, with the halter-strap over and around the friction-bars.

Figure 3 shows an end view in section, of a feeding-box, or manger, with a horse hitched, showing the operation of a horse relieving himself when he gets one foot over the strap.

The object of my invention is to facilitate the hitching of horses or cattle, so as to secure them in the stable, or at a post, and at the same time provide a means by which the animal may be relieved, in a great measure, should it get a foot over the strap or rope by which it is fastened.

My invention consists in the construction of a single metal casting, so formed with two parallel bars, and arranged in relation to each other, that a strap or rope being passed under both, and the end between the two bars, when brought together, form a reliable hitch, by the friction of the strap or rope on the bars; and when the position of the strap is such that it is not drawn together against the bar, it will easily slip sufficiently to relieve an animal should it get hampered by the strap or rope.

To enable others to make and use my invention, I will describe it more fully, referring to the drawings, and to the letters of reference marked thereon.

My improved halter-hitch for horses or cattle, is made of metal, in one single casting, and has no movable parts, such as cams, eccentrics, or levers, to bear upon the strap. It may be made of any desired form or size, either single, for a strap, A, or double, for a rope or strap, as shown in fig. 1.

The casting has a base, B B, by which it is secured to a post or manger, C.

From the base B B, extend the brackets D D, or frame which supports the parallel bars E E in their proper relation to each other, and out from the plane where it is fastened, a sufficient distance to admit the passing of the strap A, or rope, up under the two bars E E, where it is brought over and between them, as seen in fig. 2.

When the hitch is made for the purpose of using either a strap or a rope, there is a cross-bar, e, between the parallel bars E E, leaving suitable spaces, G and H, for both strap and rope; and for the purpose of clamping the rope firmly, there is a projecting arm, F, on the lower bar E', extending inward to the plane of the base, B B. The space I, between the arm F, and one of the brackets D and the bar E', forms a semicircle, or an ellipse, in which the rope is drawn and held, in the same manner that the strap A is held in the other place on the parallel bars E E.

If desirable, the bars may be cast with a roughened surface, $ff$, where the strap A is to bear on them, to cause more friction.

To hitch a horse or other animal to my improved fixture, you have simply to pass the end of the strap of the halter up from the under side of both bars, bring it forward over the top bar, and tuck the end through back of the lower bar, so that the two straps, or the strap doubled over the top bar, will both be brought together to bear on the lower bar, as seen in fig. 2, and the harder the horse or animal pulls laterally, the more firmly it is secured. But when it gets a foot over the strap or rope, and brings the strap down to or nearly a perpendicular position, it is sufficiently relieved from the friction on the bars, as to allow the animal to put its feet down in a proper position, and raise its head, so as not to be uncomfortable in its position.

Having thus fully described my invention,

What I claim as new, and desire to secure by Letters Patent, is—

1. A halter-hitch, constructed with two parallel bars E E, the whole being made complete in one single piece of casting, operating in the manner substantially as and for the purposes herein set forth.

2. The arm F, as attached to the bar E', in combination with one of the brackets D, to hold a cord or rope, for the purpose of hitching with either a round rope or a flat strap, in the manner as herein described.

GEORGE RACE.

Witnesses:
J. B. WOODRUFF,
J. C. WOODWORTH.